(12) United States Patent
Lee

(10) Patent No.: US 11,475,483 B2
(45) Date of Patent: *Oct. 18, 2022

(54) SYSTEM FOR PROVIDING IMPRESSIONS BASED ON CONSUMER PREFERENCES FOR FUTURE PROMOTIONS

(71) Applicant: Groupon, Inc., Chicago, IL (US)

(72) Inventor: Injae Lee, Bellevue, WA (US)

(73) Assignee: GROUPON, INC., Chicago, IL (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/018,744

(22) Filed: Sep. 11, 2020

(65) Prior Publication Data

US 2021/0065238 A1    Mar. 4, 2021

Related U.S. Application Data

(63) Continuation of application No. 16/251,809, filed on Jan. 18, 2019, now Pat. No. 10,803,487, which is a continuation of application No. 14/211,840, filed on Mar. 14, 2014, now Pat. No. 10,223,709.

(51) Int. Cl.
*G06Q 30/02* (2012.01)
*G06F 40/205* (2020.01)

(52) U.S. Cl.
CPC ....... *G06Q 30/0257* (2013.01); *G06F 40/205* (2020.01); *G06Q 30/0269* (2013.01)

(58) Field of Classification Search
CPC .............................. G06Q 30/02; G06F 40/205
See application file for complete search history.

(56) References Cited

U.S. PATENT DOCUMENTS

| | | | |
|---|---|---|---|
| 5,418,717 A * | 5/1995 | Su | G06F 40/216 704/9 |
| 2002/0120507 A1 | 8/2002 | Changs et al. | |
| 2008/0183571 A1* | 7/2008 | Aaron | G06Q 30/02 705/14.39 |
| 2008/0243502 A1* | 10/2008 | Ativanichayaphong | G10L 15/193 704/E15.04 |
| 2008/0300981 A1 | 12/2008 | Crites et al. | |

(Continued)

OTHER PUBLICATIONS

U.S. Appl. No. 16/251,809, filed Jan. 18, 2019, U.S. Pat. No. 10,803,487, Issued.

(Continued)

*Primary Examiner* — Vincent M Cao
(74) *Attorney, Agent, or Firm* — Alston & Bird LLP

(57) ABSTRACT

Methods, apparatus, and computer program products are disclosed for providing an impression to a consumer based on consumer preferences for future promotions. The methods include accessing consumer preferences for future promotions that specify at least one promotion request relating to a provider or a promotion category, and one or more promotion qualities, analyzing a plurality of promotions to identify those that satisfy the consumer preferences, and providing an impression to the consumer indicating the availability of the identified promotions. In embodiments, the methods can be used to identify promotions that are combinable with additional promotions offered by the same provider. Corresponding apparatus and computer program products are also provided.

20 Claims, 6 Drawing Sheets

(56) References Cited

U.S. PATENT DOCUMENTS

2012/0136707 A1* 5/2012 Chang ............... G06Q 30/0225
705/14.23
2014/0229408 A1* 8/2014 Vijayaraghavan .... G06F 16/353
706/46

OTHER PUBLICATIONS

U.S. Appl. No. 14/211,840, filed Mar. 14, 2014, U.S. Pat. No. 10,223,709, Issued.

* cited by examiner

SYSTEM FOR PROVIDING IMPRESSIONS BASED ON CONSUMER PREFERENCES FOR FUTURE PROMOTIONS

CROSS-REFERENCE TO RELATED APPLICATIONS

The present application is a continuation of U.S. application Ser. No. 16/251,809, titled "SYSTEM FOR PROVIDING IMPRESSIONS BASED ON CONSUMER PREFERENCES FOR FUTURE PROMOTIONS," filed Jan. 18, 2019, which is a continuation of U.S. application Ser. No. 14/211,840, titled "SYSTEM FOR PROVIDING IMPRESSIONS BASED ON CONSUMER PREFERENCES FOR FUTURE PROMOTIONS," filed Mar. 14, 2014, the contents of which are incorporated herein by reference in their entirety.

TECHNOLOGICAL FIELD

Example embodiments of the present invention relate generally to providing an impression to a consumer for a promotion and, more particularly, to providing an impression indicating the availability of at least one promotion that satisfies consumer preferences for future promotions.

BACKGROUND

Applicant has discovered problems with existing methods and systems for promotion management. Through applied effort, ingenuity, and innovation, Applicant has solved many of these identified problems by developing a solution that is embodied by the present invention and described in detail below.

BRIEF SUMMARY

Accordingly, methods, apparatus, and computer program products are provided for providing an impression indicating the availability of at least one promotion that satisfies consumer preferences for future promotions.

In a first example embodiment, a method is provided. The method includes accessing consumer preferences for future promotions, wherein the consumer preferences specify at least one promotion request relating to a provider or a promotion category, and one or more promotion qualities that are requested by the consumer in a future promotion, parsing machine readable text relating to a plurality of promotions to extract one or more redemption parameters, analyzing the redemption parameters relating to the plurality of promotions offered by a promotion and marketing service to identify promotions that satisfy the consumer preferences, wherein each of the provider, the promotion category, and the promotion qualities of the plurality of promotions are compared to the consumer preferences, and providing an impression to the consumer indicating the availability of the identified promotions that satisfy the consumer preferences.

In some embodiments, the consumer preferences for future promotions are provided by the consumer.

In other embodiments, the consumer preferences for future promotions are predicted based on the consumer's search history, purchase history, profile, location, favorites, or any combination thereof.

In some embodiments, the promotion category comprises a type of event, a type of good, a type of service, a type of experience, a specific location, a specific venue, or any combination thereof.

In some embodiments, the one or more promotion qualities comprises one or more thresholds, one or more redemption parameters, or a combination thereof.

In some embodiments, the one or more thresholds comprises a price threshold, a discount threshold, a quantity threshold, a provider rating threshold, a promotion duration threshold, or any combination thereof.

In some embodiments, the one or more redemption parameters comprises a term, a constraint, a limitation, a rule, or timing for the redemption of the future promotion by a provider.

In some embodiments, the one or more redemption parameters comprises combinability of two or more promotions. In such embodiments, the analyzing step of the method comprises analyzing the plurality of promotions to identify a first promotion that is combinable with at least one additional promotion offered by the same provider, and analyzing the plurality of promotions to identify at least one additional promotion that is combinable with the first promotion.

In some embodiments, combinability is determined by analyzing provider parameters, redemption parameters, database tags, promotion text, or any combination thereof, to determine if the first promotion and the at least one additional promotion can, or cannot, be combined with other promotions offered by the same provider.

In some embodiments, the first promotion and the at least one additional promotion are combinable for the same product, service, or experience, or are combinable for a different product, service, or experience.

In some embodiments, the identified promotions that satisfy the consumer preferences comprise one or more redemption parameters.

In some embodiments, the identified promotions that satisfy the consumer preferences comprise one or more promotion and marketing services.

In some embodiments, the identified promotions that satisfy the consumer preferences comprise one or more provider parameters.

In another example embodiment, an apparatus is provided. The apparatus includes a processor and a memory, the memory storing computer program code that, when executed by the processor, causes the apparatus to access consumer preferences for future promotions, wherein the consumer preferences specify at least one promotion request relating to a provider or a promotion category, and one or more promotion qualities that are requested by the consumer in a future promotion, parse machine readable text relating to a plurality of promotions to extract one or more redemption parameters, analyze the redemption parameters relating to the plurality of promotions offered by a promotion and marketing service to identify promotions that satisfy the consumer preferences, wherein each of the provider, the promotion category, and the promotion qualities of the plurality of promotions are compared to the consumer preferences, and provide an impression to the consumer indicating the availability of the identified promotions that satisfy the consumer preferences.

In another example embodiment, a computer program product is provided. The computer program product includes a computer-readable storage medium comprising computer program code that, when executed by an apparatus, causes the apparatus to access consumer preferences for future promotions, wherein the consumer preferences specify at least one promotion request relating to a provider or a promotion category, and one or more promotion qualities that are requested by the consumer in a future promotion, parse machine readable text relating to a plurality of promotions to extract one or more redemption parameters, analyze the redemption parameters relating to the plurality of promotions offered by a promotion and marketing service to identify promotions that satisfy the consumer preferences, wherein each of the provider, the promotion category, and the promotion qualities of the plurality of promotions are compared to the consumer preferences, and provide an impression to the consumer indicating the availability of the identified promotions that satisfy the consumer preferences.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
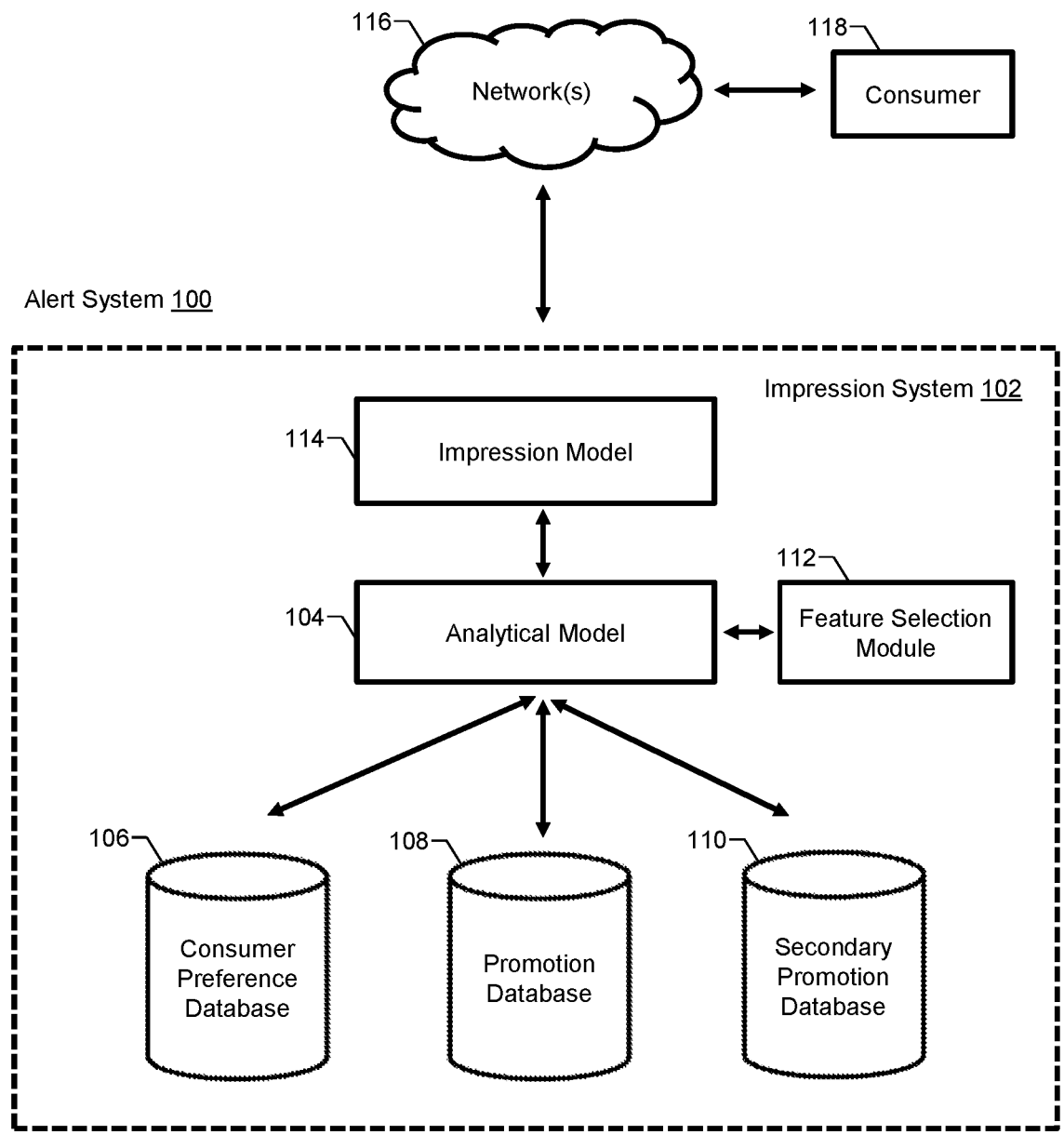
Figure 2:
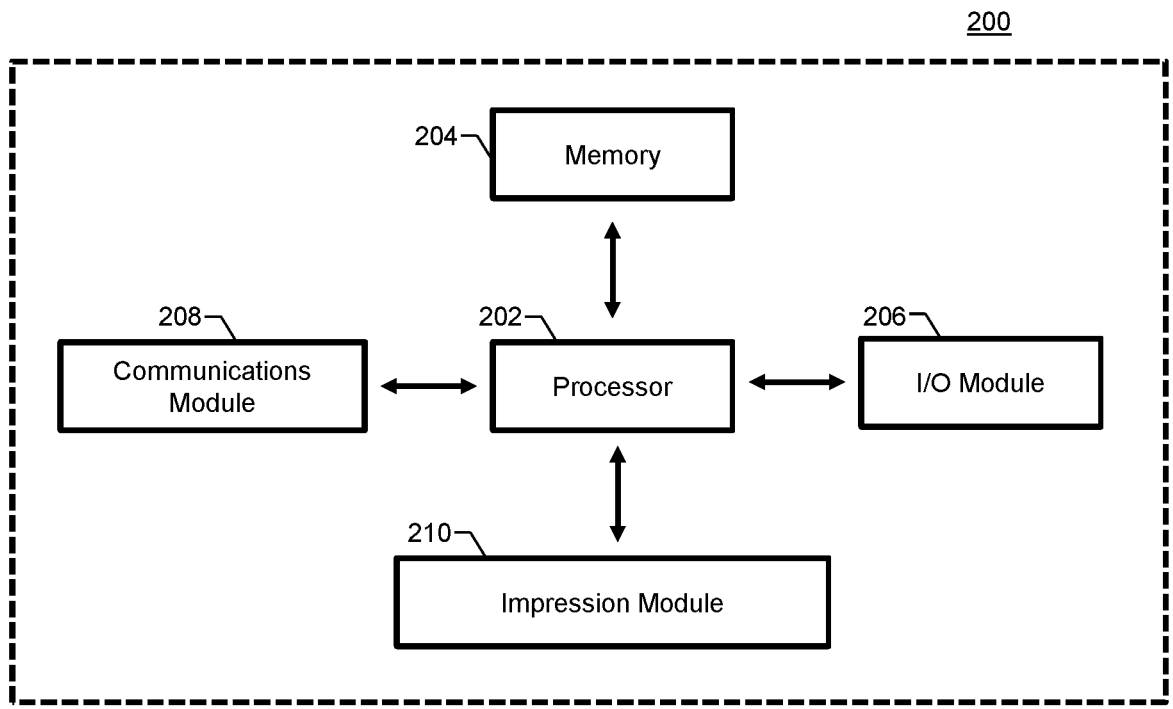
Figure 3:
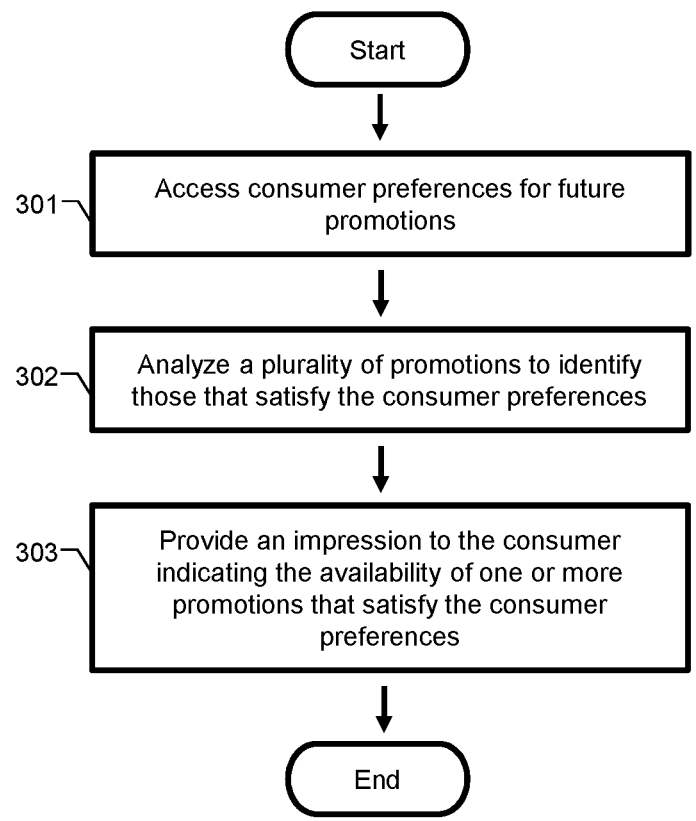
Figure 4:
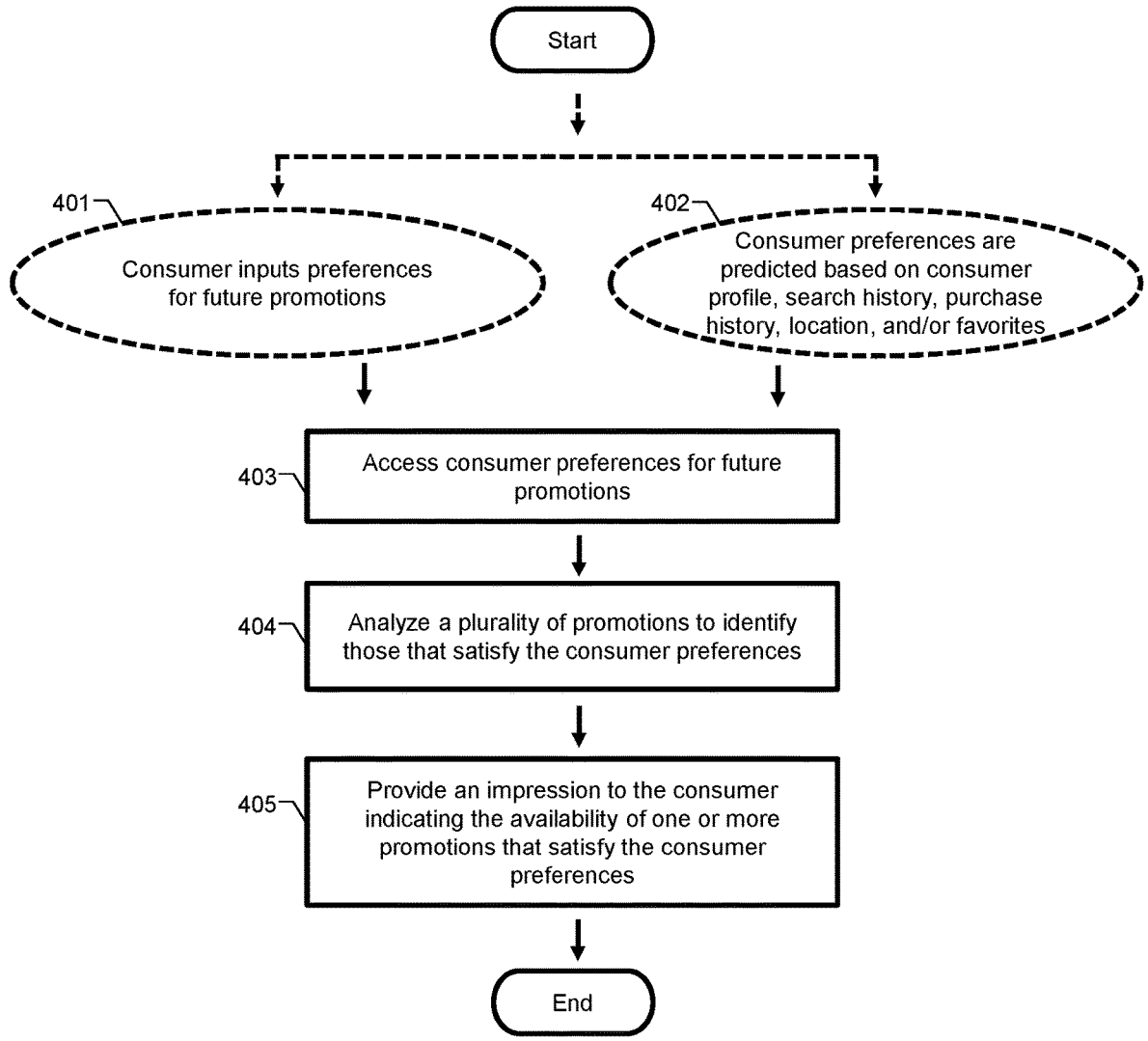
Figure 5:
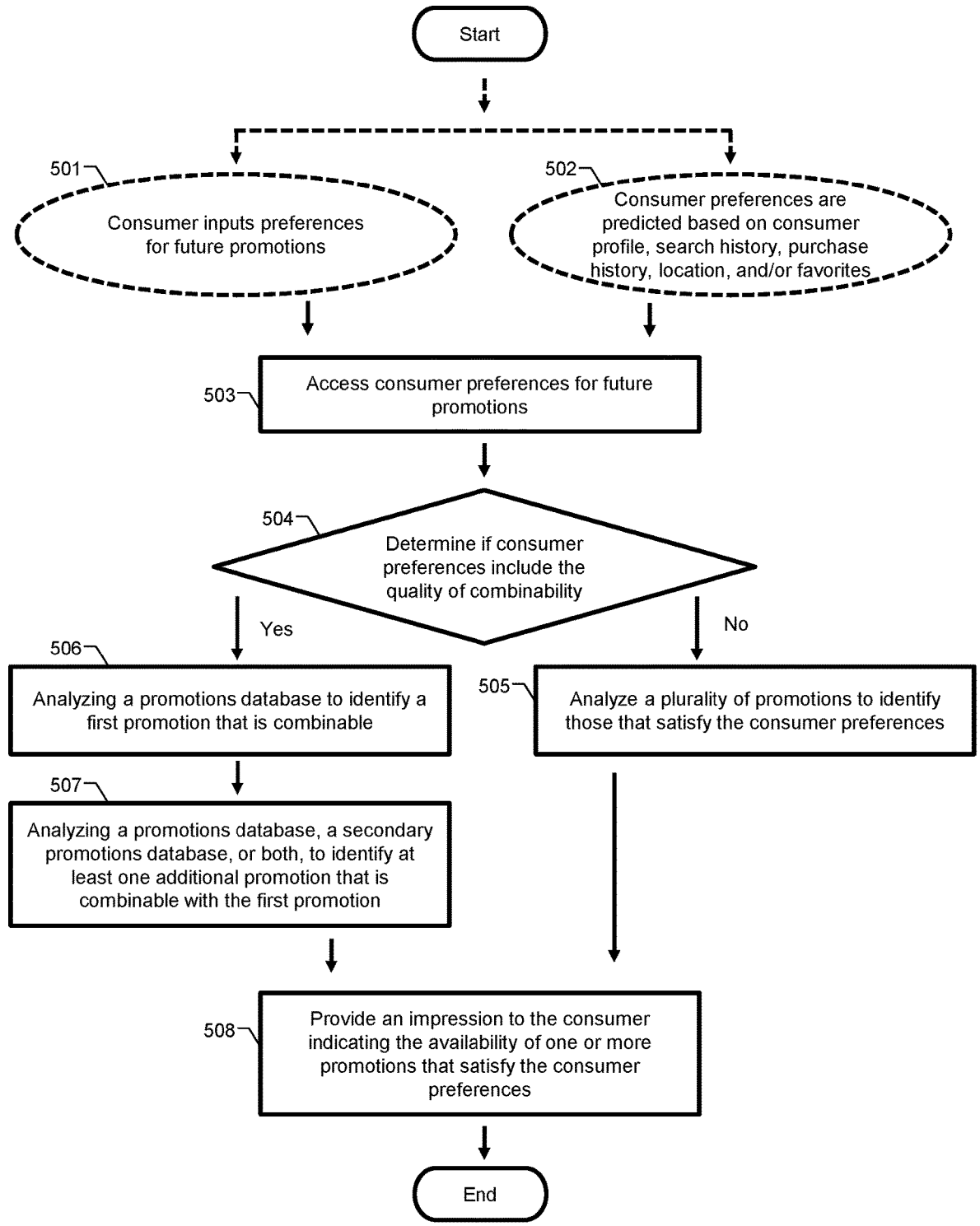
Figure 6:
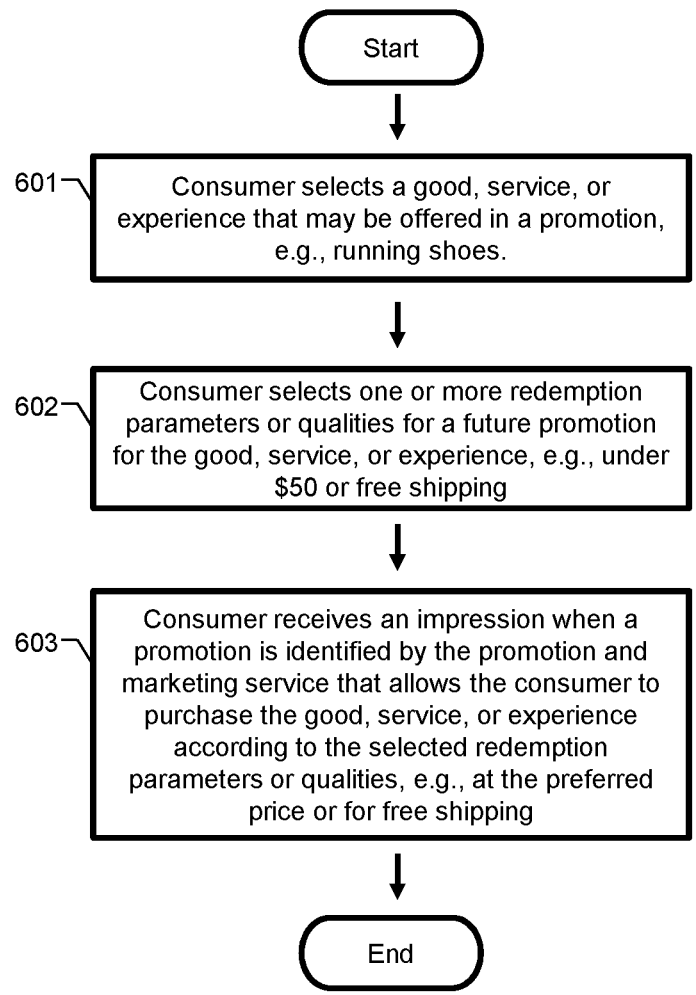

Having thus described certain example embodiments of the present disclosure in general terms, reference will now be made to the accompanying drawings, which are not necessarily drawn to scale, and wherein:

FIG. 1 illustrates an example system within which example embodiments of the present invention may operate;

FIG. 2 illustrates a block diagram showing an example device for use in an impression promotion and marketing system configured to provide impressions, in accordance with some example embodiments of the present invention;

FIG. 3 illustrates a flowchart describing example operations for providing an impression to a consumer for a promotion based on consumer preferences, in accordance with some example embodiments;

FIG. 4 illustrates a flowchart describing example operations for an embodiment of the operations illustrated in FIG. 3, wherein consumer preferences for future promotions are input by a consumer, or wherein consumer preferences for future promotions are predicted, in accordance with some example embodiments;

FIG. 5 illustrates a flowchart describing example operations for another embodiment of the operations illustrated in FIG. 3 and FIG. 4, wherein consumer preferences may include the quality of combinability, and wherein a plurality of promotions are analyzed to identify two or more promotions that are combinable, in accordance with some example embodiments; and FIG. 6 illustrates a flowchart describing an example process of the embodiments illustrated in FIGS. 3-5, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "provider" may include, but is not limited to, a merchant, business owner, consigner, shopkeeper, tradesperson, vender, operator, entrepreneur, agent, dealer, organization, or the like that is in the business of a providing a good, service, or experience to a consumer, facilitating the provision of a good, service, or experience to a consumer and/or otherwise operating in the stream of commerce. For example, a provider may be in the form of a running company that sells attire that is generally used by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or more promotions. For example, and using the aforementioned running company as the example provider, a consumer may be an individual who is interested in purchasing running shoes.

As used herein, the term "promotion" may include, but is not limited to, any type of offered, presented, or otherwise indicated reward, discount, coupon, credit, deal, incentive, discount, media, or the like, that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion request" may include a request made by a consumer to a promotion and marketing service to receive an impression for a future promotion that satisfies particular consumer preferences. In one embodiment, a promotion request may relate to future promotions offered by a particular provider and/or future promotions offered in a specific promotion category, in combination with one or more promotion qualities.

As used herein, the term "promotion category" may include specific classifications into which promotions offered by a promotion and marketing service may be divided based on the properties of the goods, services, or experiences. By way of example, such categories may include, without limitation, a type of event, a type of good, a type of service, a type of experience, a specific location or venue, specific hobbies or interests, and/or particular holidays or seasonal events.

As used herein, the term "promotion qualities" may include one or more thresholds, one or more redemption parameters, one or more provider policies, or any combination thereof, that are associated with a promotion offered by a promotion and marketing service.

As used herein, the term "promotion and marketing service" may include a service that is accessible via one or more computing devices and is operable to provide example promotion and/or marketing services on behalf of one or more providers that are offering one or more instruments that are redeemable for goods, services, experiences, and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value, and/or the like.

As used herein, the term "provider parameters" may include parameters, bounds, considerations, and/or the like, that outline or otherwise define the term, timing, constraints, limitations, rules, or the like, that are indicative of how the promotion or marketing service may structure one or more promotions. Example provider parameters include, using the aforementioned running company as the example provider, limit one instrument per person, total of 100 instruments to be issued and an expiration of all instruments by May 29, 2013.

As used herein, the term "impression" may include an alert communication provided to a consumer, a display, or other perceived indication, such as a flyer, print media, e-mail, text message, application alert, mobile applications, other type of electronic interface or distribution channel, and/or the like, of one or more promotions. For example, and using the aforementioned running company as the example provider, an e-mail communication sent to consumers that indicates the availability of a $25 for $50 toward running shoes promotion. In one embodiment, an impression may be an alert communication provided to a consumer indicating the availability of one or more promotions that have been identified as satisfying consumer preferences for future promotions.

As used herein, the term "instrument" may include, but is not limited to, any type of gift card, tender, electronic certificate, medium of exchange, voucher, or the like, that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption parameters" may include parameters, bounds, considerations, and/or the like, that outline the term, timing, constraints, limitations, rules or the like for how and/or when an instrument may be redeemed. For example, an indication that the instrument must be redeemed prior to a specified deadline, for a specific good, service or experience and/or the like. For example, using the aforementioned running company as the example provider, a limit of one instrument per visit, in store only or an expiration of May 29, 2013. In one embodiment, redemption parameters may include the combinability of two or more promotions offered by the same provider.

As used herein, the term "redemption" may include the use, exchange or other presentation of an instrument for at least a portion of a good, service, or experience as defined by the instrument and its related offer. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned running company as the example provider, is the exchange of the $50 instrument and $50 for the purchase of $100 running shoes.

Overview

Methods, apparatus, and computer program products are provided in accordance with an example embodiment of the present invention in order to provide methods for providing an impression to a consumer indicating the availability of at least one promotion that satisfies consumer preferences for future promotions.

In some examples, a promotion and marketing service is configured to provide consumers with various promotions for products, services, or experiences offered by providers. Following the input of a consumer's search parameters, the promotion and marketing service comprises methods for providing an impression to the consumer for promotions that satisfy their search. In certain example instances, however, a suitable promotion may not be offered at the time the consumer conducts a search, and the consumer may wish to be informed of future promotions that satisfy their specific preferences. Examples provided herein enable the promotion and marketing service to provide an impression to a consumer, indicating the availability of at least one promotion that satisfies consumer preferences for future promotions.

In certain example instances, consumer preferences may specify at least one promotion request for a future promotion. The promotion request may request a specific provider or a specific promotion category, in combination with one or more promotion qualities. Such promotion qualities may include any number of promotion characteristics including, without limitation, one or more thresholds, one or more redemption parameters, or a combination thereof.

To identify those promotions that satisfy the consumer preferences for future promotions, embodiments of the invention account for analyzing a plurality of promotions offered by the promotion and marketing service. The process of analyzing may compare the provider, the promotion category, and the promotion qualities of a plurality of promotions to those set forth in the consumer preferences, thereby identifying those that satisfy the consumer preferences. In embodiments of the invention, analyzing a plurality of promotions may comprise processing the text of promotions, or the text of database tags associated with promotions, to identify keywords, phrases, clauses, and/or specified text that are indicative of a particular redemption parameter or quality set forth in the consumer preferences. In other embodiments, analyzing a plurality of promotions may comprise parsing the text of promotions, or parsing the text of database tags associated with promotions, to identify keywords, phrases, clauses, and/or specified text that may suggest that a promotion has a particular redemption parameter or quality set forth in the consumer preferences.

In one example embodiment of the invention, consumer preferences may include the quality of combinability, wherein a promotion can be combined at the time of redemption with at least one additional promotion offered by the same provider. To identify such promotions, and to provide an impression to a consumer, a plurality of promotions may be analyzed to identify a first promotion that can be combined with at least one additional promotion offered by the same provider. Subsequently, the plurality of promotions may be further analyzed to identify additional promotions, offered by the same provider, that are combinable with the first promotion.

Accordingly, the methods, apparatus, and computer program product described herein allow the promotion and marketing service to provide a consumer with impressions indicating the availability of at least one promotion that satisfies consumer preferences for future promotions, thus increasing consumer purchasing, increasing profitability for providers and the promotion and marketing service, and improving the provider and consumer experience.

System Architecture

The method, apparatus, and computer program product of the present invention may be embodied by any of a variety of devices. For example, the method, apparatus, and computer program product of an example embodiment may be embodied by a fixed computing device, such as a personal computer or a computer workstation. Further, an example embodiment may be embodied by any of a variety of mobile terminals, such as a portable digital assistant (PDA), mobile telephone, smartphone, laptop computer, tablet computer, wearable device, or any combination of the aforementioned devices.

In this regard, FIG. 1 discloses an example computing system within which embodiments of the present invention may operate. In this regard, FIG. 1 illustrates an overview for an alert system 100 configured to provide an impression indicating the availability of at least one promotion that satisfies consumer preferences for future promotions. The alert system 100 includes an impression system 102 that includes an analytical model 104 that is in communication with databases 106, 108, and 110, feature selection module 112, and impression model 114. The impression system 102 is in communication with one or more networks 116 that are in communication with a consumer 118.

In example embodiments, the analytical model 104 may include one or more components for accessing consumer preferences for future promotions, analyzing a plurality of promotions offered by a promotion and marketing service to identify those that satisfy consumer preferences, and providing an impression to a consumer indicating the availability of identified promotions that satisfy consumer preferences. In other example embodiments, the analytical model 104 may include one or more components for analyzing a plurality of promotions to identify a first promotion that is combinable with at least one additional promotion offered by the same provider, and subsequently analyzing the plurality of promotions to identify the at least one additional promotion that is combinable with the first promotion.

To perform the various analyses, the analytical model 104 communicates with one or more databases that are part of (or work in conjunction with) the impression system 102 such as a consumer preference database 106, a promotion database 108, a secondary promotion database 110, and/or a feature selection module 112. With respect to the particular consumer, the analytical model 104 may access the consumer preference database 106 in order to obtain the consumer preferences for future promotions. In one embodiment, such consumer preferences comprise at least one promotion request relating to a provider or a promotion category, and one or more promotion qualities that are requested by the consumer in a future promotion.

The promotion database 108 is configured to comprise a plurality of promotions offered by a promotion and marketing service, as well as data relating to each promotion that can be analyzed according to the embodiments. In one embodiment, the promotion database 108 may be created and maintained by the promotion and marketing service.

The secondary promotion database 110 is configured to comprise a plurality of promotions offered by providers, as well as data relating to each promotion, that can be analyzed according to the embodiments. In one embodiment, the secondary promotion database 110 may be accessible to the promotion and marketing service, but is not created or maintained by the promotion and marketing service. In another embodiment, the secondary promotion database 110 may comprise different promotions than those found in promotion database 108. In yet another embodiment, the secondary promotion database 110 may comprise one or more promotions that are combinable with one or more promotions in promotion database 108. In some examples, the secondary promotion database 110 may comprise, or otherwise have access to, one or more additional promotions offered by another promotion and marketing service, one or more additional promotions offered by one or more providers, one or more additional promotions available via one or more promotion providers, and/or the like. In some examples, the promotion database 108 and the secondary promotion database 110 may be the same database.

The feature selection module 112 is configured to analyze and/or classify one or more terms or phrases in a plurality of promotions to determine the promotions redemption parameters and/or qualities of the promotions by processing machine readable text by ignoring, extracting, modifying, and/or deleting specific terms or phrases, or creating a new document without words or phrases that may not be indicative of a redemption parameter or quality. The feature selection module 112 may be further configured to calculate a score corresponding to the significance of particular words or phrases in a redemption parameter or promotion quality, and to select or extract a subset of relevant words or phrases identified as features based on such scores.

The impression model 114 is configured to be in communication with the analytical model 104 and to generate impressions based on the analysis performed by the analytical model 104. Alternatively or additionally, the impression model 114 may be configured to generate impressions irrespective of the analytical model 104. In such cases, the analytical model 104, in some examples, may provide an indication of one or more impressions that are combinable, satisfy consumer preferences, or the like.

The network(s) 116 are configured to communicate the impressions generated by the impression system 102 to the consumer 118. The network 116 may include one or more wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

Although FIG. 1 has been illustrated to show separate databases 106, 108, and 110, FIG. 1 has been illustrated for demonstrative purposes only, and it is contemplated to have the databases 106, 108, and 110 arranged in any combination of one or more memories/storage units.

The prediction system 102 may be embodied by a computing system, such as apparatus 200 shown in FIG. 2. As illustrated in FIG. 2, the apparatus 200 may include a processor 202, a memory 204, an input/output module 206, a communications module 208, and a prediction module 210, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The impression module 210 may be used to perform operations resulting in providing an impression to a consumer indicating the availability of at least one promotion that satisfies consumer preferences for future promotions. In this regard, as noted above, the module may be used for a number of operations including, without limitation, accessing consumer preferences for future promotions, analyzing a plurality of promotions offered by a promotion and marketing service to identify promotions that satisfy the consumer preferences, and providing an impression to a consumer indicating the availability of identified promotions that satisfy consumer preferences. In other example embodiments, the module may be used for analyzing a plurality of promotions to identify a first promotion that is combinable with at least one additional promotion offered by the same provider, and subsequently analyzing the plurality of promotions to identify the at least one additional promotion that is combinable with the first promotion.

Example Prediction Operations

As described herein, example embodiments of the present invention are disclosed for providing an impression for a new promotion based consumer preferences.

FIG. 3 illustrates a flowchart containing example operations for providing an impression indicating the availability at least one promotion that satisfies consumer preferences for future promotions. The operations illustrated in FIG. 3 may, for example, be performed by the impression system 102, such as, in one example embodiment, apparatus 200, and may use processor 202, memory 204, I/O module 206, communications module 208, and impression module 210.

In operation 301, the apparatus 200 includes means, such as processor 202, memory 204, I/O module 206, communications module 208, impression module 210, or the like, for accessing from consumer preference database 106 consumer preferences for future promotions. In one embodiment, consumer preferences may include at least one promotion request made by a consumer for promotions offered by a particular provider, or for promotions in a particular promotion category, wherein the promotion request further specifies particular promotion qualities. In some embodiments, consumer preferences may be accessed from a consumer preference database and/or a secondary consumer preference database. In some examples, the consumer preferences may include a particular price threshold, a particular redemption parameter, a particular good, service, or experience, a particular time, a particular location, and/or the like.

In some examples, consumer preferences may include one or more qualities of a promotion, which may be in the form of specific redemption parameters and/or thresholds. Thresholds may include a specified value associated with a promotion at which a consumer requests that an impression be provided. In one example, a threshold may be a price threshold, wherein a price for a promotion is at, or below, a specified amount. In another example, a threshold may be a discount threshold, wherein a promotion is offered for a discount at, or above, a specified percentage. In another example, a threshold may be a quantity threshold, wherein a promotion is offered for at least a specified number of products, services, or experiences. In yet another example, a threshold may be a provider rating threshold, wherein a provider has at least a specified rating as determined by the promotion and marketing service, by other services that report provider ratings, by other consumers, or by any combination thereof. In yet another example, a threshold may be a promotion duration threshold, wherein a promotion has at least a specified length of time for redemption.

In further examples, consumer preferences may be configured to identify an overlap of a consumer's particular interests. For example, consumer preferences may identify a local area (e.g., Ballard), a particular service (e.g., Thai Cuisine), and a particular time or range of times (e.g., Friday and Saturday nights). In other cases, the preferences may be directed to a good, where the consumer preference identifies a discount (e.g., at least five percent off) and a shipping offer (e.g., at least free shipping). In further cases, consumer preferences may be used to drive relevance and, therefore, be more indicative of certain types or qualities of promotions that should be provided.

In operation 302, the apparatus 200 includes means, such as processor 202, memory 204, I/O module 206, communications module 208, impression module 210, or the like, for analyzing a plurality of promotions in promotion database 108 to identify those that satisfy consumer preferences. In one embodiment, each of the provider, the promotion category, and the promotion qualities of the plurality of promotions are analyzed and compared to those specified in consumer preferences accessed in operation 301. As such, a subset of the promotions offered by the promotion and marketing service may be identified that satisfy consumer preferences.

In some examples, a promotion may satisfy consumer preferences by meeting all of the redemption parameters or qualities set forth in the consumer preferences. In other examples, a promotion may satisfy consumer preferences by meeting a percentage of redemption parameters or qualities. In such an example, the percentage may range from 50% up to 100%, or may be about 50%, 55%, 60%, 65%, 70%, 75%, 80%, 85%, 90%, 95%, or 100% of the redemption parameters or qualities in consumer preferences.

In some examples, analyzing may include an operation wherein a plurality of promotions are processed or otherwise parsed to determine their redemption parameters or qualities. In one example, analyzing may comprise processing the text of promotions (e.g. based on machine readable text captured from an electronic source, an image of a paper promotion, a scan of a print advertisement or the like), or the text of database tags associated with promotions, to identify keywords, phrases, clauses, and/or specified text that are indicative of a particular redemption parameter or quality (e.g., provider, promotion category, and/or quality). In some examples, promotions may already be stored in an electronic format, such as a database, and thus database tags may include one or more descriptive terms that are associated with a promotion in a database. Analyzing may alternatively comprise parsing the text of promotions, or parsing the text of database tags associated with promotions, to identify keywords, phrases, clauses, and/or specified text that may suggest that a promotion has a particular redemption parameter or quality. In particular examples, a promotion quality may include the combinability of two or more promotions offered by the same provider.

In some examples, a learning algorithm may be used to analyze and classify one or more terms or phrases in a promotion. In some example embodiments, the system may be configured for accessing and/or receiving a corpus (e.g., a structured set of texts) representing a plurality of previously offered promotions. The corpus may comprise one or more promotions with an associated label classifying its redemption parameters or qualities (e.g., not combinable). Once the corpus is accessed, the system may be configured for ignoring, extracting, modifying, deleting, or otherwise creating a new document without words that may not be indicative of a redemption parameter or quality such as one or more of common words (e.g., a, an, and, for), rare words (e.g., words appearing only once), stop words, or the like. For example, if a document mapped to a particular redemption parameter or quality included the phrase "this promotion expires in 7 days," the feature selection module 112 may remove "this" and "in." In some examples, common words, rare words, stop words, or the like, are simply ignored.

The system may be further configured for calculating a score corresponding to a significance of a particular word within the redemption parameters. A feature scoring method, may include, but is not limited to, binormal separation (BNS). For example, $F^{-1}(tpr) - F^{-1}(fpr)$, where F−1 is the standard Normal distribution's inverse cumulative probability function, tpr is true positive rate and fpr is the false positive rate. Other metrics may also be used for the feature selection, which include, but are not limited to F-measure, Information Gain, Chi Squared, Odds ratio, Document Frequency, and/or the like.

The system may be configured for selecting or otherwise extracting a subset of words as features based on the scoring. In an example embodiment, the system may select any word meeting or otherwise satisfying a predetermined threshold. In another embodiment, a predetermined number of words are selected (e.g., the 1,000 words with the highest scores where the highest scored words are those words that are most likely able to identify a particular redemption parameter). For example, and based on the example above, "expires" and "days" may be scored and, providing they satisfy the predetermined threshold, may be extracted as features by feature selection module 112.

In some examples, the extracted features may then be used by analytical model 104 to analyze one or more accessed promotions. For example, redemption parameters, preferences, or the like, may be analyzed (e.g., the words in the instrument may be parsed) to determine one or more redemption parameters or qualities. For example, the text (e.g., machine readable text) of a promotion may be extracted such as from a promotion offered via a website, an email, or the like, or from a promotion that has been stored electronically (e.g., a physical coupon that has been scanned) or the like.

In some examples, one or more stop words may be removed (e.g., a, is, the, etc.) from the set of words or text extracted from the promotion. Once stop words are removed, the one or more remaining words and the distance between the words may be compared to the feature set from the train set to determine one or more parameters or qualities relating to the promotion. For example, a date may be identified if it is within n words of the word "expires.". In other examples, days of the week may be extracted and identified as limitations on the date of redemption, "combine" and synonyms thereof may be selected along with words within n words to determine whether combinability is permitted, and/or the like.

As such, using the foregoing language processing methodology, one or more promotions offered by a promotion and marketing service may be compared to one or more promotions offered by an entity external to the promotion and marketing service. The combinability of two or more promotions offered by the same provider may be determined according this process. Thus, a consumer may advantageously be allowed to benefit from multiple promotions when purchasing a good, service, or experience.

In some examples, combinability may include the ability to pair two or more promotions offered by the promotion and marketing service. In such examples, a consumer may be able to combine two or more of the same promotion, or two or more different promotions, offered by a provider. For instance, a consumer may be able to combine two promotions of $10 for $20 towards running shoes, or may combine a promotion of $10 for $20 towards running shoes with a promotion for a 25% discount off of running shoes. In another such example, two or more consumers may be able to combine the same promotion, or different promotions, offered by the provider. For instance, two consumers may combine promotions for a 50% discount off of entry to a sporting event when making a single purchase. In another instance, two consumers may combine a promotion for a 50% discount off of entry to a sporting event with a $10 discount for entry to the same event when making a single purchase.

In other examples, combinability may include the ability to pair a promotion offered by the promotion and marketing service with promotions offered by the same provider through other sources or from a third party promotion issuer. Such sources may include coupon or discount databases that are accessible from the internet (e.g., another marketing and promotion service, an online promotion database, coupons made available via social networking websites), email communications sent by the provider (e.g., company newsletters), periodicals such as advertising circulars or subscription magazines, in-store promotions offered by the provider (e.g., coupons provided on the shelf or with purchase), promotions that are included with a purchased good (e.g., a package insert providing a promotion), other sales or discounts unrelated to promotions and/or the like.

In some examples, promotions may be combined with sales offered by a traveling service to enable travel to be booked (e.g. a restaurant promotion is redeemable during the time a consumer has a hotel booked nearby). In other examples, promotions may be combined with sales offered to attend an event, such as a sporting event (e.g., the availability of sports apparel at a provider near the event) or concert, or for entertainment, such as a movie. In other examples, promotions may be combined with sales offered for memberships, such as discounted gym memberships (e.g., multiple sources offering free months of membership), or subscriptions, such as discounted magazine or online subscriptions. In yet other examples, promotions may be combined with sales offered for goods, such as department or store-wide discounts offered by a provider for clothing, sports equipment, or any other goods (e.g., determining whether a promotion is redeemable during the half-yearly sale or some other current sale, comparing promotion parameters with non-promotion parameters provided by a merchant, such as a website policy noting that only one instrument per visit, or the like). In further examples, promotions may be combined with sales offered for food or dining, such as restaurant discounts. In further examples, promotions may be combined with sales offered for services, such as discounted lawn service, automotive care, and the like. In further examples, promotions may be combined with sales offered for activities, such as discounted lessons, classes, sports, and the like. Other advantageous examples are additionally available to one or more consumers.

In operation 303, the apparatus 200 includes means, such as processor 202, memory 204, I/O module 206, communications module 208, impression module 210, or the like, for providing an impression to the consumer. In one embodiment, the impression indicates the availability of identified promotions that satisfy consumer preferences. In some examples, an impression may be provided to the consumer via one or more networks in the form of an alert, such a mobile device notification, an electronic message, a tweet, a text message, or the like. In other examples, impressions may include any number of identified promotions available at a given time. In further examples, impressions may be provided to the consumer at a specific time indicated by the consumer (e.g., next Friday), at regular intervals indicated by the consumer (e.g., every Friday), at any time promotions are identified that satisfy consumer preferences, and/or at intervals determined by the promotion and marketing service.

FIG. 4 illustrates a flowchart containing example operations for one embodiment of the operations illustrated in FIG. 3. The operations illustrated in FIG. 4 may, for example, be performed by the impression system 102, such as, in one example embodiment, apparatus 200, and may use processor 202, memory 204, I/O module 206, communications module 208, and prediction module 210.

Optionally, operation 401 may be included, wherein the apparatus 200 includes means, such as processor 202, memory 204, I/O module 206, communications module 208, impression module 210, or the like, for a consumer to input consumer preferences for future promotions. Such consumer preferences may be stored, for example, in consumer preference database 106. In some examples, a consumer may input consumer preferences into consumer preference database 106 via a user interface in the form of a fixed computing device or a mobile terminal, such as a portable digital assistant (PDA), mobile telephone, smartphone, laptop computer, tablet computer, wearable device, or any combination thereof. In other examples, consumer preferences may be imported by the consumer from a separate database or computing device into consumer preference database 106.

Alternatively, operation 402 may optionally be included, wherein the apparatus 200 includes means, such as processor 202, memory 204, I/O module 206, communications module 208, impression module 210, or the like, for predicting consumer preferences. In one embodiment, consumer preferences may be predicted based on a consumer's search history, purchase history, profile, location, favorites, or any combination thereof. Such consumer preferences may be stored, for example, in consumer preference database 106.

Machine learning is often used to develop a particular pattern recognition algorithm (i.e. an algorithm that represents a particular pattern recognition problem, such as determining particular consumer preferences) that is based on statistical inference. In some embodiments, the promotion and marketing service may receive signals from a consumer, such as information on browsing history, indication or certain types of liked promotions, indication of purchased transactions, certain consumer inputs, and/or the like.

For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, content analysis includes a source-specific classifier that takes a source-specific representation of the content received from a particular source as an input and produces an output that categorizes that input as being likely to include a relevant data reference or as being unlikely to include a relevant data reference. In some embodiments, the source-specific classifier is a trainable classifier that can be optimized as more instances of content for analysis are received from a particular source.

In operation 403, the apparatus 200 includes means, such as processor 202, memory 204, I/O module 206, communications module 208, impression module 210, or the like, for accessing from consumer preference database 106 consumer preferences for future promotions. In one embodiment, consumer preferences specify at least one promotion request relating to a provider or a promotion category, and one or more promotion qualities that are requested by the consumer in a future promotion.

In operation 404, the apparatus 200 includes means, such as processor 202, memory 204, I/O module 206, communications module 208, impression module 210, or the like, for analyzing a plurality of promotions in promotion database 108 that satisfy consumer preferences. In one embodiment, each of the provider, the promotion category, and the promotion qualities of the plurality of promotions are analyzed and compared to those specified in consumer preferences accessed in operation 403.

In operation 405, the apparatus 200 includes means, such as processor 202, memory 204, I/O module 206, communications module 208, impression module 210, or the like, for providing an impression to the consumer. In one embodiment, the impression indicates the availability of identified promotions that satisfy consumer preferences.

FIG. 5 illustrates a flowchart containing example operations for another embodiment of the operations illustrated in FIG. 3 and FIG. 4. The operations illustrated in FIG. 5 may, for example, be performed by the impression system 102, such as, in one example embodiment, apparatus 200, and may use processor 202, memory 204, I/O module 206, communications module 208, and prediction module 210.

Optionally, operation 501 may be included, wherein the apparatus 200 includes means, such as processor 202, memory 204, I/O module 206, communications module 208, impression module 210, or the like, for a consumer to input consumer preferences for future promotions. Such consumer preferences may be stored, for example, in consumer preference database 106.

Alternatively, operation 502 may optionally be included, wherein the apparatus 200 includes means, such as processor 202, memory 204, I/O module 206, communications module 208, impression module 210, or the like, for predicting consumer preferences. In one embodiment, consumer preferences may be predicted based on a consumer's search history, purchase history, profile, location, favorites, or any combination thereof. Such consumer preferences may be stored, for example, in consumer preference database 106.

In operation 503, the apparatus 200 includes means, such as processor 202, memory 204, I/O module 206, communications module 208, impression module 210, or the like, for accessing from consumer preference database 106 consumer preferences for future promotions. In one embodiment, the consumer preferences specify at least one promotion request relating to a provider or a promotion category, and one or more promotion qualities that are requested by the consumer in a future promotion.

In operation 504, the apparatus 200 includes means, such as processor 202, memory 204, I/O module 206, communications module 208, impression module 210, or the like, for determining if consumer preferences include the quality of combinability. In some examples, combinability may include the ability to redeem a promotion (e.g., a first promotion) in combination with one or more additional promotions offered by the same provider, such that all promotions are simultaneously accepted by the provider at the time of redemption. In one example, a first promotion and one or more additional promotions may be combinable for the same good, service, or experience offered by a provider. For example, a first promotion offering $25 for $50 towards running shoes may be combinable with a second promotion offering $10 for $20 towards shoes. In another embodiment, a first promotion and one or more additional promotions may be combinable for a different product, service, or experience offered by a provider. For example, a first promotion offering $25 for $50 towards running shoes may be combinable with a second promotion offering $5 for $10 towards socks when running shoes are purchased. If consumer preferences do not include combinability, operation 505 is performed. If consumer preferences do include combinability, operations 506 and 507 are performed.

In operation 505, the apparatus 200 includes means, such as processor 202, memory 204, I/O module 206, communications module 208, impression module 210, or the like, for analyzing a plurality of promotions in promotion database 108 that satisfy the consumer preferences. In one embodiment, each of the provider, the promotion category, and the promotion qualities of the plurality of promotions are analyzed and compared to those specified in consumer preferences in operation 503.

In operation 506, the apparatus 200 includes means, such as processor 202, memory 204, I/O module 206, communications module 208, impression module 210, or the like, for analyzing a plurality of promotions in promotion database 108 to identify a first promotion that is combinable with at least one additional promotion offered by the same provider. In one embodiment, combinability is determined by analyzing provider parameters, redemption parameters, database tags, promotion text, or any combination thereof, to determine if the first promotion can, or cannot, be combined with other promotions offered by the same provider.

In operation 507, the apparatus 200 includes means, such as processor 202, memory 204, I/O module 206, communications module 208, impression module 210, or the like, for analyzing a plurality of promotions in promotion database 108 to identify at least one additional promotion that is combinable with the first promotion identified in operation 506. In one embodiment, the at least one additional promotion is identified in promotion database 108. In another embodiment, the at least one additional promotion is identified by analyzing secondary promotion database 110. In another embodiment, combinability is determined by analyzing provider parameters, redemption parameters, database tags, promotion text, or any combination thereof, to determine if the at least one additional promotion can be combined with other promotions offered by the same provider, such as the first promotion identified in operation 506. In another embodiment, the first promotion and the at least one additional promotion are combinable for the same product, service, or experience offered by the same provider. In yet another embodiment, the first promotion and the at least one additional promotion are combinable for a different product, service, or experience offered by the same provider.

FIG. 6 illustrates a flowchart describing an example process performed according to the operations illustrated in FIGS. 3-5. In operation 601, a consumer selects a good, service, or experience that may be offered in a promotion (e.g., running shoes) by a promotion and marketing service.

In operation 602, the consumer selects one or more redemption parameters or qualities for a future promotion for the good, service, or experience (e.g., running shoes under $50 or free shipping). Examples of redemption parameters and qualities are provided elsewhere herein.

Alternatively or additionally, in some examples, the consumer may request an alert when there are running shoes available that are particular price. In some examples, that price may include a final price, such a price that includes any taxes and shipping. In response, the system described herein may be configured to locate such a promotion by attempting to combine one or more available promotions, sales or other discounts to acquire the running shoes according to the requested redemption parameters or qualities. Alternatively or additionally, the system may monitor the promotions offered by a promotion and marketing service and then attempt to combine one or more promotions to enable the consumer to acquire the running shoes according to the requested redemption parameters or qualities. In either case, once available, the promotion and marketing service may alert the consumer.

In operation 603, the consumer receives an impression from the promotion and marketing service when one or more promotions are identified that allow the consumer to purchase the good, service, or experience according to the selected redemption parameters or qualities (e.g., at the preferred price or free shipping).

Accordingly, as disclosed in conjunction with FIGS. 3-6, embodiments of the present invention illustrate operations that provide an impression indicating the availability of at least one promotion that satisfies consumer preferences for future promotions. Moreover, embodiments of the present invention include reinforcement learning operations that ensure accuracy of such impressions over time.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, may be implemented by various means including computer program instructions. These computer program instructions may be loaded onto a general purpose computer, special purpose computer, or other programmable data processing apparatus to produce a machine, such that the computer program product includes the instructions, which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

Example 1

As described above, embodiments of the present invention are disclosed for providing an impression indicating the availability of at least one promotion that satisfies consumer preferences for future promotions. By way of example, a consumer may wish to purchase a promotion from a promotion and marketing service for running shoes from a local athletic store. The consumer may wish to purchase running shoes from a specific store that is located within a specific area. The consumer may also wish to purchase running shoes for a price of no more than $50, or for a discount of at least 30%. Upon searching the promotion and marketing service database, the consumer may find that no promotions currently offered are satisfactory. However, the consumer may wish to receive an alert from the promotion and marketing service of any future promotions that satisfy these preferences.

To receive alerts from the promotion and marketing service, the consumer may input specific preferences, specifying a promotion request relating to the type of product they wish to purchase (i.e., running shoes), a specific provider that they wish to purchase from, a specific area where they wish to make the purchase, and qualities of the promotion, such as a price limit, discount percentage, redemption parameter, and/or the like. In this example, the consumer may wish to receive alerts for promotions for running shoes sold by a specific athletic store in their city, where the running shoes cost no more than $50 or are offered at a discount of at least 30%. The consumer may also specify that they wish to receive alerts for any promotions offered by the athletic store that are combinable with other promotions offered by the athletic store.

Alternatively, the consumer may indicate that they wish to receive alerts for future promotions, and the promotion and marketing service may then predict the consumer's preferences based on the consumer's profile, search history, purchase history, favorites, location, and/or the like.

The promotion and marketing service then analyzes new promotions on a regular basis to identify those that satisfy the consumer preferences. When satisfactory promotions are identified, the promotion and marketing service sends an alert to the consumer, indicating the availability of the identified promotions. The consumer may then purchase one or more of the promotions for redemption by the provider.

In the present example, the consumer may receive an alert that their preferred athletic store is offering a plurality of promotions for running shoes at a nearby location. One such promotion is $50 for a pair of running shoes, meeting one of the consumer's preferences. Another such promotion is a discount of 30% off of running shoes, meeting another of the consumer's preferences. The alert indicates that the two promotions are also combinable, as requested by the consumer, and can be redeemed together for a single purchase. Upon purchasing the two combinable promotions, the consumer redeems them together when purchasing the running shoes. As a result, the shoes have a cost of $50 that is further reduced by an additional 30% to $35.

Example 2

In another example of the previous scenario, the consumer may receive an alert that their preferred athletic store is offering a plurality of promotions for running shoes at a nearby location. One such promotion is $50 for a pair of running shoes, meeting one of the consumer's preferences. Another such promotion is for buy one, get one free for running shoes, which the alert indicates is combinable with the first promotion. Upon purchasing the two promotions, the consumer redeems them together when purchasing running shoes. As a result, the consumer purchases two pairs of shoes, the first pair for $50, and the second pair for free.

What is claimed is:

1. An apparatus, comprising at least one processor and at least one memory for storing instructions that, with the at least one processor, cause the apparatus to:
   parse promotion text associated with a plurality of promotions;
   calculate a score, using binormal separation (BNS), for each word within one or more redemption parameters of the promotion text, the score representing a programmatically generated likelihood that the word identifies a particular redemption parameter and a significance of the word within the one or more redemption parameters;
   identify, based at least in part on scores calculated for the words within the one or more redemption parameters, one or more promotions that satisfy at least one preference associated with at least one promotion request received from a consumer device; and
   transmit an impression to the consumer device, wherein the impression comprises content associated with the one or more identified promotions.

2. The apparatus of claim 1, wherein a redemption parameter specifies how and when a promotion may be redeemed.

3. The apparatus of claim 1, wherein the impression indicates an availability of the one or more identified promotions.

4. The apparatus of claim 1, wherein the consumer device is associated with a consumer.

5. The apparatus of claim 4, wherein the at least one preference comprises a consumer preference for future promotions associated with the consumer.

6. The apparatus of claim 5, wherein the consumer preference is associated with at least one promotion request relating to a provider or a promotion category.

7. The apparatus of claim 5, wherein the consumer preference comprises one or more promotion qualities that are requested by the consumer for a future promotion.

8. The apparatus of claim 1, wherein the impression indicates a combinability of two or more promotions of the one or more identified promotions.

9. The apparatus of claim 1, wherein the impression comprises one or more of an electronic message, a tweet, a text message, an alert, or a mobile device notification.

10. The apparatus of claim 1, wherein parsing the promotion text comprises extracting the one or more redemption parameters of the promotion text.

11. A computer-implemented method, comprising:
   parsing promotion text associated with a plurality of promotions;
   calculating a score, using binormal separation (BNS), for each word within one or more redemption parameters of the promotion text, the score representing a programmatically generated likelihood that the word identifies a particular redemption parameter and a significance of the word within the one or more redemption parameters;
   identifying, based at least in part on scores calculated for the words within the one or more redemption parameters, one or more promotions that satisfy at least one preference associated with at least one promotion request received from a consumer device; and
   transmitting an impression to the consumer device, wherein the impression comprises content associated with the one or more identified promotions.

12. The computer-implemented method of claim 11, wherein a redemption parameter specifies how and when a promotion may be redeemed.

13. The computer-implemented method of claim 11, wherein the impression indicates an availability of the one or more identified promotions.

14. The computer-implemented method of claim 11, wherein the consumer device is associated with a consumer.

15. The computer-implemented method of claim 14, wherein the at least one preference comprises a consumer preference for future promotions associated with the consumer.

16. The computer-implemented method of claim 15, wherein the consumer preference is associated with at least one promotion request relating to a provider or a promotion category.

17. The computer-implemented method of claim 15, wherein the consumer preference comprises one or more promotion qualities that are requested by the consumer for a future promotion.

18. The computer-implemented method of claim 11, wherein the impression indicates a combinability of two or more promotions of the one or more identified promotions.

19. The computer-implemented method of claim 11, wherein the impression comprises one or more of an electronic message, a tweet, a text message, an alert, or a mobile device notification.

20. A computer program product comprising at least one non-transitory computer readable storage medium comprising computer code that, when executed by a processor, cause an apparatus to:
   parse promotion text associated with a plurality of promotions;
   calculate a score, using binormal separation (BNS), for each word within one or more redemption parameters of the promotion text, the score representing a programmatically generated likelihood that the word identifies a particular redemption parameter and a significance of the word within the one or more redemption parameters;
   identify, based at least in part on scores calculated for the words within the one or more redemption parameters, one or more promotions that satisfy at least one preference associated with at least one promotion request received from a consumer device; and
   transmit an impression to the consumer device, wherein the impression comprises content associated with the one or more identified promotions.

* * * * *